United States Patent
Murugesan et al.

(10) Patent No.: US 10,616,139 B1
(45) Date of Patent: *Apr. 7, 2020

(54) REDUCING QUOTA ACCESS

(71) Applicant: Google LLC, Mountain View, CA (US)

(72) Inventors: Vijayakumar Murugesan, Mountain View, CA (US); Vedant Bhangale, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/240,153

(22) Filed: Jan. 4, 2019

Related U.S. Application Data

(63) Continuation of application No. 14/871,377, filed on Sep. 30, 2015, now Pat. No. 10,178,046.

(51) Int. Cl.
*H04L 12/911* (2013.01)
*G06F 9/50* (2006.01)

(52) U.S. Cl.
CPC .......... *H04L 47/827* (2013.01); *H04L 47/783* (2013.01); *G06F 9/5005* (2013.01); *H04L 47/821* (2013.01)

(58) Field of Classification Search
CPC ... H04L 47/783; H04L 47/821; H04L 47/827; H04L 41/5009; G06F 9/5005
USPC .................................................. 709/224, 226
See application file for complete search history.

(56) References Cited

U.S. PATENT DOCUMENTS

| | | | |
|---|---|---|---|
| 5,446,737 A * | 8/1995 | Cidon | H04L 12/433 370/452 |
| 8,560,805 B1 | 10/2013 | Yakovlev | |
| 2009/0235283 A1 | 9/2009 | Kim | |
| 2010/0229218 A1 * | 9/2010 | Kumbalimutt | G06F 9/5005 726/4 |
| 2012/0102506 A1 | 4/2012 | Hopmann | |
| 2014/0359113 A1 | 12/2014 | Krebs | |

* cited by examiner

*Primary Examiner* — Zi Ye
(74) *Attorney, Agent, or Firm* — Fish & Richardson P.C.

(57) ABSTRACT

Within a time period, a plurality of selected requests that are each associated with a weight is received. For the plurality of received selected requests, a single quota request is synchronously provided for a quota associated with all of the plurality of received selected requests. The quota is received. The selected requests are sorted in an order based on the weights of the received selected requests. Based on the order of the sort, only a number of the selected requests that meets the quota is allowed.

20 Claims, 4 Drawing Sheets

REDUCING QUOTA ACCESS

CROSS-REFERENCE TO RELATED APPLICATIONS

This application is a continuation of U.S. application Ser. No. 14/871,377, filed Sep. 30, 2015, the contents of which are here by incorporated by reference.

BACKGROUND OF THE INVENTION

Due to limited resources, often utilization of backend online services is limited by a quota for the resource. For example, bandwidth, data amount, number of requests, data transfer amount, etc. are often limited resources that only can be utilized by a user in allocated limited quantities. In order to track the amount of resources utilized/remaining, a quota is often maintained at a centralized database. However, access and update of the quota data may be a source of a performance bottleneck as the number of requests to access and update the quota increases.

BRIEF DESCRIPTION OF THE DRAWINGS

Various embodiments of the invention are disclosed in the following detailed description and the accompanying drawings.

DETAILED DESCRIPTION

Figure 1:
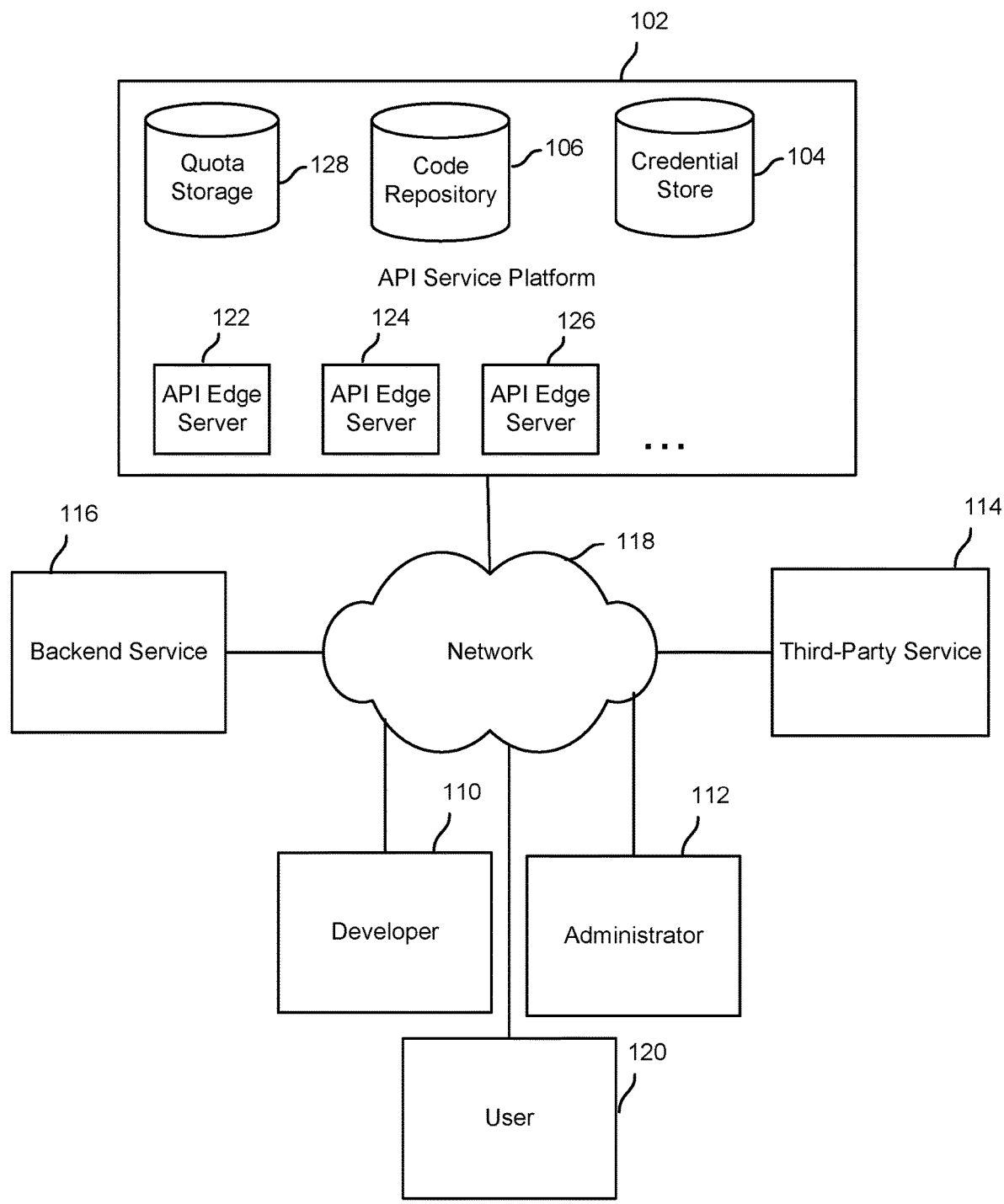
FIG. 1 is a block diagram illustrating an embodiment of a system for managing a quota.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

In some embodiments, rather than accessing and updating a quota for each request of a limited resource, a single quota access is performed for a plurality of requests. For requests received within a certain time window, a single request for an associated quota is made. For example, an edge server processing requests gathers all requests associated with the same quota received within a time window and makes a single request for the quota for the requests rather than individually requesting the quota for each request as the request is processed. Each of the requests may be associated with a weight and the received requests are sorted based on the weights. For example, the weight identifies an amount of a limited resource limited by the quota required to serve/process/complete the request. Only a number of the received requests that are allowable within a limit of the quota is allowed. For example, in the event allowing all of the received requests will exceed the limit of the quota, one or more of the received requests are selected to be allowed from the sorted list in a manner that will not exceed the quota. In one example, the requests are selected for allowance in the lowest to highest weight order until the quota is exhausted. In another example, the requests are selected for allowance in the highest to lowest weight order until the quota is exhausted.

FIG. 1 is a block diagram illustrating an embodiment of a system for managing a quota. API (Application Programming Interface) service platform 102 is connected to backend service 116, developer 110, administrator 112, user 120, and third-party service provider 114 via network 118. API service platform 102 includes credential store 104, code repository 106, API edge servers 122, 124 and 126, and quota storage 128. The individual components of platform 102 may be networked together and/or directly connected to network 118.

Often, providers want to make their backend services available online for consumption by applications running on mobile devices and desktops. For example, an organization might want to expose its services that provide product pricing and availability information, sales and ordering services, order tracking services, and any other services required by client apps by exposing services as a set of web endpoints. Client application developers may then make web requests to these endpoints in developed application code. The client applications that consume these services can be implemented as standalone apps for a mobile device or tablet, as web apps running in a browser, or as any other type of application that can make a request to a web endpoint and consume any response data. These applications might be developed and released by the same organization that exposed the services or by third-party app developers who make use of publicly available services.

Developers also face challenges when trying to consume services from different providers. The same client application might have to use one mechanism to consume a service from one provider, and a different mechanism to consume a service from a different provider. Developers must ensure that they have taken all necessary steps to secure and protect their services from unauthorized access. Security credentials also have to be carefully managed to ensure that security credentials required to utilize services do not become compromised by unauthorized users. After a client application that accesses services has been released, a service provider is then required to make sure that those services continue to function over time as they add, modify, or delete those services. The service provider must also have a way to keep developers aware of any changes to the services to ensure that client apps stay in sync with those services.

In some embodiments, API service platform 102 enables secure access to backend service 116 via an API (e.g., well-defined API that is consistent across services, regardless of service implementation) hosted by platform 102. For example, rather than having a client application (e.g., application of user 120) access backend service 116 directly, the client application accesses platform 102 that functions to map a publicly available web endpoint via an API to backend service 116. Backend service 116 may include any service provider and/or content repository of an organization. In some embodiments, in effect, platform 102 acts as a proxy for content and/or a server provided by backend service 116. In some embodiments, developer 110 provides application code that will implement functionality of an API provided by platform 102 to access services of backend service 116. For example, a mobile application executed by user 120 interacts with application code provided by developer 110 (e.g., API implementing code provided by developer 110) and implemented on platform 102 to access services of backend service 116. In some embodiments, backend service 116 is optional and application code provided by developer 110 provides functionality without accessing backend service 116. In some embodiments, developer 110 also programs a user application executed by user 120 to access services of platform 102. For example, developer 110 develops both a user application to be executed by user 120 and application code executed by platform 102 that interfaces with the user application to provide access to backend service 116. The application code (e.g., compiled program, uncompiled program, source code, script, API implementation code, etc.) provided by developer 110 may be stored by platform 102.

API service platform 102 provides its services using one or more API edge servers that each handle requests. By utilizing a plurality of API edge servers, fault tolerance, load balancing, and geographical distribution may be achieved. For example, each request is routed to one of the API edge servers handling requests based on current load of the servers and geographical closeness of the requester to a particular API edge server.

Quota storage 128 includes one or more values that identify one or more quotas associated with one or more limited resources. An example of the quota includes a numeric value of an amount of resources utilized/remaining. Examples of the resources limited by the quota include bandwidth, data amount, storage amount, number of requests, data transfer amount, number of users, and another limited property of an online service and/or server. In some embodiments, each quota entry stored in quota storage 128 includes a user/resource identifier associated with a quota and a value of the quota. For example, a user identifier and a value of a quota remaining for the user of the user identifier is included as an entry of quota storage 128. In some embodiments, for one or more limited resources that are requested from an API edge server, the API edger server obtains the associated quota from quota storage 128, verifies that allowing the request would not exceed the quota, and updates the associated quota in the event the request was allowed and utilized at least a portion of the quota. However, with multiple API edge servers and multiple requests being handled by each API edge server, the retrieval and update of the quota may become a bottleneck in processing the requests. In some embodiments, each API edge server handles quota processing of requests in groups rather than individually to reduce the number of requests and updates made to quota storage 128. For example, a single request for a quota is made for a group of requests associated with the same quota that have been gathered during a time window. The group of requests is processed for allowance/rejection based on the quota and a single update is made to the quota for the group of requests.

In some embodiments, platform 102 is able to handle the security and authorization tasks required to protect backend services, as well as to analyze, track, manage, monitor, and monetize the services. Because applications of developers make requests to platform 102, rather than directly to backend service 116, developers do not need to know the implementation detail of backend service 116. Thus platform 102 may allow isolation of developers from backend services. In some embodiments policies on platform 102 are utilized to add functionality to a service without having to make any changes to the backend service. For example, policies may be added to perform data transformations and filtering, add security, execute conditional logic or custom code, and to perform many other actions. In another example, access may be revoked/modified so that a particular user application no longer has full access to the backend services. In another example, polices may be implemented to limit, track, and mange access to services. For example, an API product may be limited by a quota on the number of requests allowed. In this example, one API product may be made available with a low access limit, such as 1000 requests per day, for a low price, while another API product provides access to the same API services, but with a much higher access limit, for a higher price. In some embodiments, platform 102 provides tools for adding and configuring APIs, applications, and related policies. In some embodiments, platform 102 is deployed within the computing environment of backend service 116. In some embodiments, platform 102 is deployed in the cloud (SaaS) where multiple entities may share platform 102.

In some embodiments, platform 102 provides API, analytics, and developer services. These services together may provide a comprehensive infrastructure for API creation, security, management, and operations, as well as backend services for developing client applications. In some embodiments, API services provide API creation and utilization services. For example, tools for adding and configuring APIs, setting up API products, and managing app developers and client apps are provided. Policies may be implemented to add security, rate-limiting, mediation, caching, etc. Behaviors may be customized by applying custom scripts, making calls out to third-party APIs and services, etc. In another example, a flexible data store and features such as social graphs, geolocation, user management, push notifications, performance monitoring, etc. are provided. In some embodiments, Java node.js may be implemented to create APIs and API mashups. In some embodiments, analytics services provide powerful tools to analyze short- and long-term usage trends of APIs. For example, audiences may be segmented by top developers and apps to understand usage by API method to know where to invest, and create custom reports on business- or operational-level information. In some embodiments, as data passes through platform 102, several types of information are collected including URL, IP, user ID for API call information, latency, error data, etc. Policies may be created to add other information, such as headers, query parameters, and portions of a request or response extracted from XML or JSON. In some embodiments, the information is collected asynchronously from the actual request/response flow and does not affect API performance. In some embodiments, developer services provide the tools to manage the community of app developers using such services. Developer services may offer the flexibility to work with internal and external developers and formalize these relationships with financial models. In some embodiments, developer services are utilized to onboard developers and create a developer portal for publicly available API products. Application developers may connect to the portal to access API documentation, forums, blog entries, etc. In some embodiments, monetization capabilities provide the financial infrastructure and relationships for digital assets. Monetization may allow a variety of rate plans that charge for the use of API products or through revenue-sharing. Monetization plans may include pre-paid plans, post-paid plans, fixed-fee plans, variable rate plans, "freemium" plans, etc. In some embodiments, platform 102 provides monetization reporting and billing services.

In some embodiments, code repository 106 stores program code to be executed/implemented by platform 102. For example, one or more developers provide application code (e.g., code implementing one or more APIs) to be executed by platform 102. In some embodiments, application code provided by developer 110, stored in code repository 106, and/or executed by platform 102 may access third-party services provided by third-party service 114. For example, content is obtained from third-party service 114 that is controlled by an entity external to an entity of backend service 116, platform 102, and user 120. In some embodiments, each request to platform 102 includes an API key that verifies access to the services of platform 102. The API key may be revoked and/or limited (e.g., limited in time, limited in count, limited in manner associated with a quota, etc.) dynamically.

In some embodiments, program code provided by developer 110 may need to access backend service 116 and/or third-party service 114 using one or more security credentials. For example, backend service 116 and/or third-party server 114 may require a valid username and password login to access its services. Although the credential may be directly specified in application code that is to utilize the credentials to access a desired service (e.g., stored directly within code provided by developer 110), storing security credentials in unsecured program code exposes the credentials to vulnerabilities. For example, the code may be stored by developer 110 in a third-party code version control repository (e.g., insecure public repository) and the program code may unintentionally become exposed to unauthorized parties via the third-party code repository. Additionally in some cases, it may not be desirable to expose credentials to a developer. For example, it may be desirable to enable a developer to develop code without direct knowledge of security credentials.

In some embodiments, credentials are stored in credential store 104. For example, security credentials to be utilized by application code executed by platform 102 are stored in credential store 104. The credentials may be provided by developer 110 and/or administrator 112 (e.g., by allowing administrator 112 to provide security credentials, developer 110 does not need to possess direct knowledge of the credentials). In some embodiments, credentials are provided for storage in credential store 104 via an API. In some embodiments, each stored security credential is associated with a reference identifier that can be utilized to identify the specific credential. For example, instead of directly including security credentials in application code, a reference to the security credentials may be utilized to reference the security credentials. When the application code is later executed, the reference may be utilized to obtain the referenced security credentials for use.

In some embodiments, only computer code executing on platform 102 has access to obtain credentials stored in credential store 104. For example, once security credentials are provided to credential store 104 for storage, the stored credentials may be only obtained from the credential store by code executing within an application execution environment provided by platform 102. In some embodiments, the connection between platform 102 and credential store 104 is a physically secure connection. For example, a direct physical connection that is not connected to other components connects platform 102 and credential store 104. In some embodiments, platform 102 has exclusive access to obtain credentials from credential store 104. Platform 102 may host a plurality of different execution environments. In some embodiments, each credential stored in credential store 104 is scoped to one or more execution environments and may only be utilized by code executing within a scoped execution environment.

In some embodiments, credentials stored in credential store 104 are encrypted. In some embodiments, security credentials stored in credential store 104 are encrypted using a plurality of different encryption keys. For example, security credentials for each different organization and/or execution environment are encrypted using an encryption key unique to the organization/environment. In some embodiments, encryption keys utilized to encrypt security credentials stored in credential store 104 are stored and encrypted in a hardware security module. In some embodiments, the hardware security module is a dedicated physical crypto processing device that safeguards and manages encryption keys. Access to the hardware security module may be protected by a master encryption key. In some embodiments, rather than utilizing a hardware security module, a storage that stores a master key encrypted encryption key is utilized.

Although the example of FIG. 1 shows code repository 106, credential store 104, and quota storage 128 separately, one or more of these components may be integrated together in a single physical storage device. Each of code repository 106, credential store 104, and quota storage 128 may include one or more hardware and/or software interfaces to store and/or obtain data. Examples of code repository 106, credential store 104, and quota storage 128 include a storage device, a secure storage, a server, a database, a distributed storage, a data structure, and any other type of storage or computing device. In some embodiments, any of the components of platform 102 may be included in the same device. In some embodiments, any of the components of platform 102 may represent a group of devices. Although three API Edge servers have been shown, in various embodiments, any number of API edge servers may exist.

Any of the components shown in FIG. 1 may represent one or more physical devices. For example, backend service 116, developer 110, user 120, administrator 112, and third-party service 114 each represent a different computer device. Any of the components shown in FIG. 1 may be integrated together with one or more other components shown in FIG. 1 and/or a component not shown in FIG. 1. For example, developer 110 and administrator 112 may be integrated on the same physical device. Examples of the platform 102, backend service 116, third-party service 114, developer 110, user 120, and administrator 112 include a server, a personal computer, a desktop computer, an electronic reader, a laptop computer, a storage, a smartphone, a tablet computer, a mobile device, a wearable device, a wearable computer, and any other computer or electronic device. Examples of network 118 include one or more of the following: a direct or indirect physical communication connection, a mobile communication network, a cellular network, a wireless network, Internet, intranet, Local Area Network, Wide Area Network, Storage Area Network, and any other form of connecting two or more systems, components, or storage devices together. In various embodiments, the components shown in FIG. 1 may exist in various combinations of hardware machines. Other communication paths may exist and the example of FIG. 1 has been simplified to illustrate the example clearly. Although single instances of components have been shown to simplify the diagram, additional instances of any of the components shown in FIG. 1 may exist. Components not shown in FIG. 1 may also exist to perform and provide functions and services described in this document.

Figure 2:
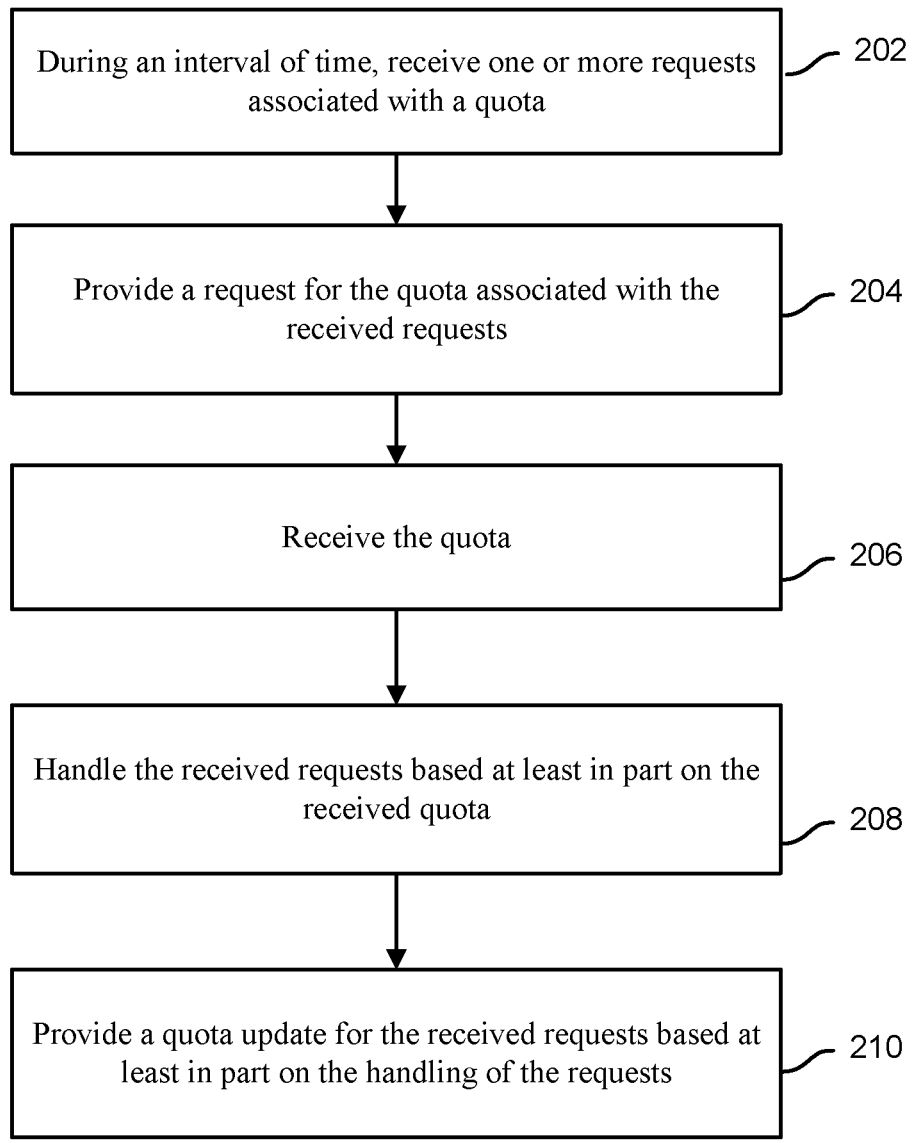
FIG. 2 is a flowchart illustrating an embodiment of a process for processing a request.

FIG. 2 is a flowchart illustrating an embodiment of a process for processing a request. The process of FIG. 2 may be implemented on platform 102 and/or any of API edge servers 122, 124 and 126.

At 202, one or more requests associated with a quota are received during an interval of time. In some embodiments, the request includes a request for data. In some embodiments, the request includes an online service request. In some embodiments, the request is received via an API. In some embodiments, the interval amount of time is approximately 30 milliseconds. In some embodiments, the interval amount of time allows the requests to be bunched together to allow quota processing to be performed together for the requests received during the time interval. For example, rather than processing requests individually as each request is received, requests associated with the quota are held for batch processing during the interval amount of time until the time interval is over. The time interval may be one of periodic time intervals and when a current interval of time is over a next interval of time begins. Examples of the resources limited by the quota include bandwidth, data size/amount, storage amount, number of requests, data transfer amount, number of users, processing resource amount, and another limited property of an online service and/or server.

Although the requests processed using the process of FIG. 2 are associated with the same quota, the process of FIG. 2 may be repeated for each different quota. Requests received during the interval of time may be associated with one or more different quotas. For example, each quota may be specific to a specific type of request for specific users, data, resources, etc. In some embodiments, one or more of the requests that are associated with the same quota are identified. For example, received requests associated with the same quota are grouped together and there may exist a plurality of groups that are each associated with a different quota. The process of FIG. 2 may be repeated for each of these different groups of received requests. In some embodiments, the process of FIG. 2 is repeated for each subsequent interval of time.

At 204, a request for the quota associated with the received requests is provided. For example, an API edge server sends a single request for a value of the quota to a repository where the quota is being tracked (e.g., quota storage 128). In some embodiments, the request includes an identifier of the quota desired to be obtained. For example, the quota identifier includes an identifier of the limited resource tracked by the quota and/or an identifier of a user/entity associated with the quota. In some embodiments, the request is a single request made for all of the received requests. For example, rather than individually sending a request for the quota as each request is individually processed, a single request is made for the quota for all of the received requests to reduce the request load for the quota. The request for the quota is made synchronously with receiving the received requests. For example the request for the quota is made synchronously with the expiration of the interval of time and as each periodic interval of time expires, a request for any associated quota is made.

At 206, the quota is received. In some embodiments, receiving the quota includes receiving a value of the quota. The received quota may be provided from a central storage storing the quota. For example, a quota value corresponding to a quota identified in the request was retrieved from a database/storage by a sender and sent to be received in 206. In some embodiments, the quota is the overall quota for the limited resource limited by the quota. For example, the quota identifies the total quota for all servers performing processing limited by the quota. In some embodiments, the received quota indicates a remaining and/or utilized amount of a limited resource.

In some embodiments, the received quota includes a quota allocation that is a portion of a total available quota. For example, the received quota indicates a portion of a total remaining quota allocated for the received requests and/or for the server that received the quota allocation. By allocating a portion of the quota for a particular group of requests and/or servers, it may ensure that other requests/servers are able to be guaranteed another portion of the quota in parallel. Otherwise, a race condition may be created when multiple servers are allowed to utilize the entire remaining quota. When multiple servers request and receive the quota in parallel and one server depletes the entire quota, another server may consume the quota believing that the entire remaining quota is available. In some embodiments, the amount of the quota allocation has been dynamically and/or statically determined based on one or more of the following: allocation utilization history of a server receiving the quota, a historical average amount of quota resource utilization, a user defined allocation amount value, an amount of remaining quota, a user associated with a server, a time of day, a day of week, a time period, a number of servers to be pre-allocated, and a priority value associated with a server receiving the quota.

At 208, the received requests are handled based at least in part on the received quota. In some embodiments, handling the requests includes allowing or not allowing one or more of the received requests based on a limit of the quota. For example, if allowing all of the requests will not exhaust the quota, all of the requests are allowed to be processed and utilize limited resources limited by the quota. However, if all of the requests cannot be allowed because the remaining quota is insufficient, one or more of the requests are selected to be allowed within a limit of the quota. This may result in one or more of the requests not being allowed because the quota has been exhausted. In some embodiments, each request may consume a different amount of the resources of the quota and the requests are sorted based on the amount of the resources required to allow and process the requests. The requests may be allowed in sorted order until the quota has been exhausted. In some embodiments, in the event one or more of the requests are determined to be not allowed, a specified behavior for the not allowed determination specific to the request is performed. For example, a requester of the request and/or an administrator/programmer of the system processing the request has specified for a specific request and/or a type of request a specific behavior to be performed in the event the request is determined to be not allowed. Examples of the specified behavior include providing a message, providing an indication, retrying the request, dropping the request, indicating a request to obtain additional quota, prompting a user to purchase additional quota, and any other desired behavior associated with the request. In some embodiments, allowing the request includes allowing the request to be processed using the limited resource constrained by the quota. In some embodiments, in the event not all of the requests can be allowed because the quota is insufficient, additional quota allocation is requested. For example, the received quota is an initial allocation of a portion of a total remaining quota and an additional allocation is requested and received.

At 210, a quota update for the received requests is provided based at least in part on the handling of the requests. For example, the amount of resources limited by the quota (e.g., amount of the quota) that has been utilized/consumed to handle the requests is provided as a single quota update for all of the received requests. The quota update may include one or more of the following values: a new updated quota value, an amount of quota utilized, an amount of quota remaining after request processing, a value to be subtracted from the quota to determine an updated quota value, and a value to be added to the quota to determine an updated quota value. In some embodiments, the quota update is a single combined update for all of the received requests that have been allowed. By providing a single combined update rather than individual updates as each request is allowed, the number of updates provided to update the quota is reduced. In some embodiments, the quota update is to be utilized to update the quota. For example, the quota update is provided to the system/storage that provided the quota received in 206 to allow the quota to be updated to reflect the consumption of the resource limited by the quota. In some embodiments, the quota update has been determined at least in part by summing the quota consumptions of those requests that have been allowed in 208.

In some embodiments, the quota update indicates an amount of a quota allocation that has been utilized and/or not utilized. For example, the received quota is an allocation of a portion of the total quota and in the event the full allocation was not all utilized in handling the requests, a value indicating the not utilized portion of the quota is provided as the update to return the allocation of the unutilized portion of the allocation. The indicated unutilized portion of the allocation may be then utilized to update the quota and/or reallocated at a later time and/or for another request/server.

Figure 3:
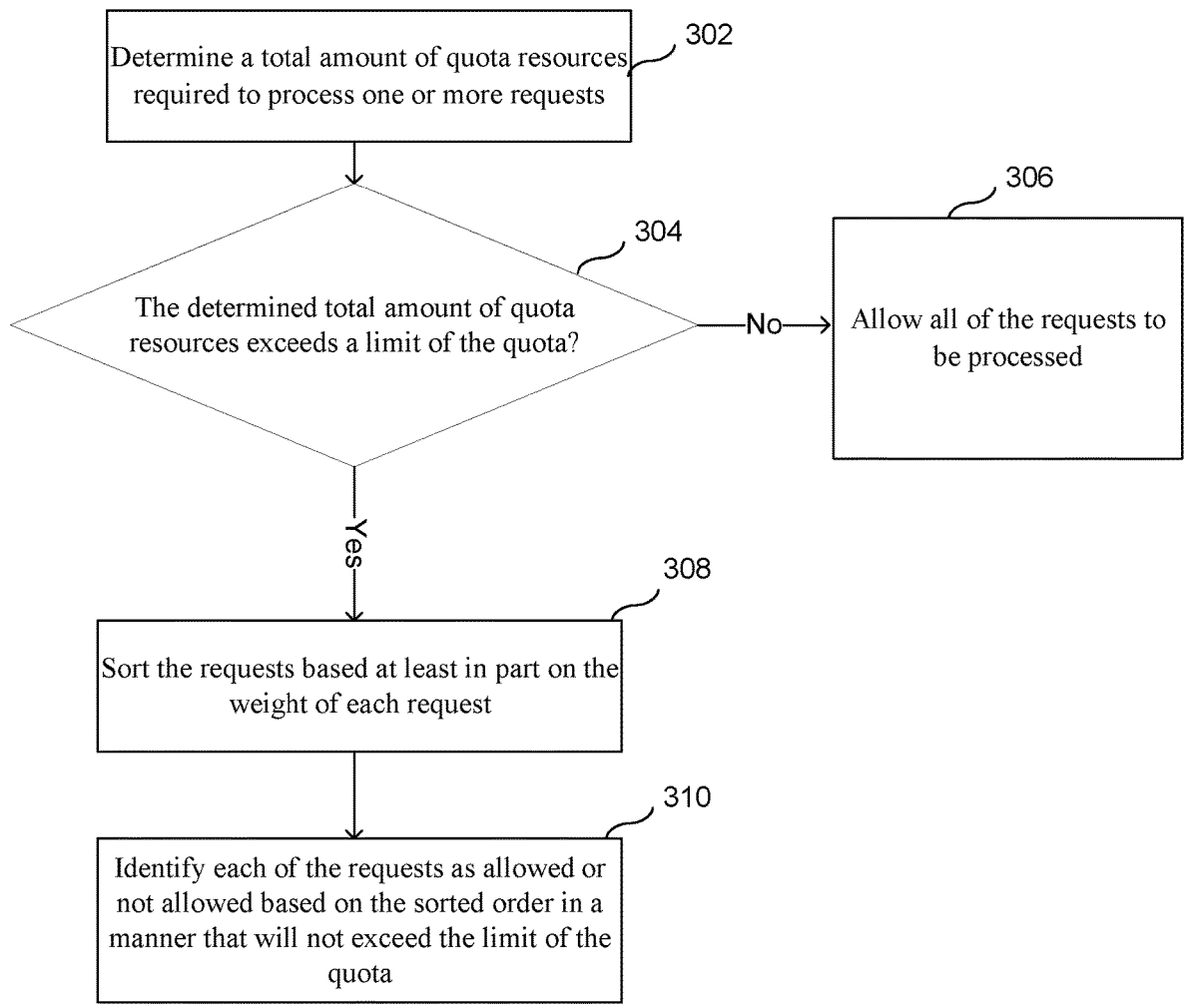
FIG. 3 is a flowchart illustrating an embodiment of a process for handling requests limited by a quota.

FIG. 3 is a flowchart illustrating an embodiment of a process for handling requests limited by a quota. The process of FIG. 3 may be implemented on platform 102 and/or any of API edge servers 122, 124 and 126. In some embodiments, the process of FIG. 3 is included in 208 of FIG. 2.

At 302, a total amount of quota resources required to process one or more requests is determined. In some embodiments, the requests are the requests received during the interval of time at 202 of FIG. 2. In some embodiments, the quota for the one or more requests has been received in 206 of FIG. 2. In some embodiments, determining the total amount of the quota resources includes summing the quota resources required to allow and process each of the requests. For example, for each of the one or more requests, the amount of resources limited by the quota required to process the each request is determined and added together to determine the total amount of quota resources.

At 304, it is determined whether the determined total amount of quota resources exceeds a limit of the quota. For example, it is determined whether the total amount of quota resources required to process all of the requests is within the limit identified by the quota. In some embodiments, determining the whether the total amount of quota resources exceeds the limit includes determining whether the total amount is greater than a limit value of the quota. In some embodiments, determining the whether the total amount of quota resources exceeds the limit includes determining whether the sum of the total amount and a quota utilization value is greater than the limit of the quota. For example, the quota utilization value indicates a total amount of a limited resource that has been currently utilized and the total amount determined in 302 is added to this quota utilization value and compared with the threshold limit of the quota to determine whether the sum value is over the threshold limit. In some embodiments, determining whether the determined total amount exceeds the limit includes determining whether the determined total amount is below the limit.

If at 304 it is determined that the determined total amount does not exceed the limit, at 306 all of the requests are allowed to be processed. For example, the requests are allowed to utilize the limited resource tracked by the quota and to be processed until completion. In some embodiments, the total amount of quota resources utilized by the requests is tracked for reporting (e.g., reported in 210 of FIG. 2).

If at 304 it is determined that the determined total amount exceeds the limit, at 308 the requests are sorted based at least in part on the weight of each request. In some embodiments, the weight of each request is determined based on one or more of the following: the amount of quota resource to be utilized by the request to process/complete the request, an assigned priority value, a length of time since the request was received/requested, a priority associated with a requester of the request, and an amount of one or more other resources required to process/complete the request. For example, the requests are sorted from smallest to largest amount of quota resource to be utilized by the request to process/complete the request.

At 310, each of the requests are identified as allowed or not allowed based on the sorted order in a manner that will not exceed the limit of the quota. For example, each request is allowed one by one in the sorted order until the quota is exhausted. In one example, the requests have been ordered in an order of smallest to largest ascending amount of resource of the quota to be utilized by each request and the maximum number of one or more of the resources that will require the smallest resource amounts is allowed in the order of the ascending list without exceeding the limit of the quota (e.g., sum of amount of resources to be utilized by the allowed requests is still below the value of the limit). This may allow the largest number of requests within the limit. In another example, the requests have been ordered in an order of descending amount of resource of the quota to be utilized by each request (e.g., largest to smallest) and the maximum number of one or more of the resources that will require the largest amount of resources is allowed in the order of the descending list within the limit of the quota (e.g., sum of amount of resources to be utilized by the allowed requests is still below a value of the limit). This may allow the resource heavy requests to be allowed first. In some embodiments, the requests are allowed in an associated priority order until the quota has been exhausted. In some embodiments, the scheme of the order in which a request is selected for allowance is selected among a plurality of different ordering schemes (e.g., selection is alternated among the schemes). In some embodiments, allowing a request includes allowing the request to utilize the limited resource tracked by the quota to complete the request. In some embodiments, the amount of quota resources utilized by the allowed request(s) is tracked for reporting (e.g., reported in 210 of FIG. 2).

In some embodiments, one or more of the requests that have not been selected to be allowed are held to be allowed at a later time when additional quota is available/provided. For example, additional quota may be requested and received to allow processing of the remainder of the requests. In some embodiments, one or more of the requests that have not been selected to be allowed are identified/determined as not allowed requests. A specified behavior specific to a request for the not allowed determination may be performed. For example, a requester of the request and/or an administrator/programmer of the system processing the request has specified for the request a specific behavior to be performed in the event the request is determined to be not allowed. Examples of the specified behavior include providing a message, providing an indication, retrying the request, dropping the request, indicating a request to obtain additional quota, prompting a user to purchase additional credits, and any other desired behavior associated with the request.

Figure 4:
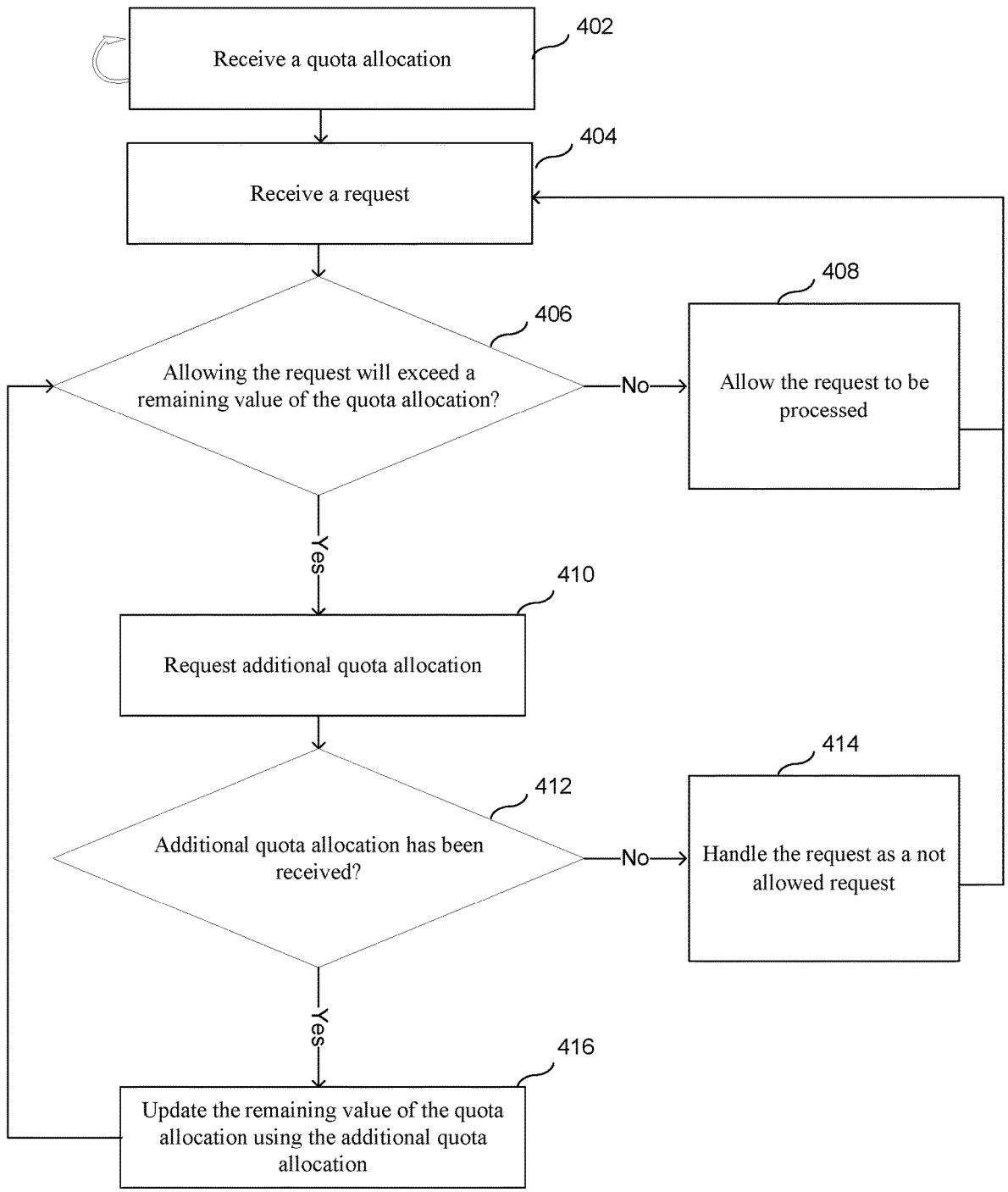
FIG. 4 is a flowchart illustrating an embodiment of a process for handling requests using a pre-allocated quota.

FIG. 4 is a flowchart illustrating an embodiment of a process for handling requests using a pre-allocated quota. The process of FIG. 4 may be implemented on platform 102 and/or any of API edge servers 122, 124 and 126. In some embodiments, at least a portion of the process of FIG. 4 is included in 206 and/or 208 of FIG. 2.

At 402, a quota allocation is received. For example, a numerical value indicating the quota allocation is received. In some embodiments, the received quota allocation is a pre-allocation of at least a portion of a total quota of a limited resource. For example, rather than requiring each API edge server to continually request and receive the latest quota, a predetermined amount of quota is pre-allocated to one or more API edge servers prior to receiving a request that will utilize the quota allocation to enable the API edge servers to allow processing of future requests using the pre-allocation without requesting the quota. In some embodiments, the quota allocation is pre-allocation. By pre-allocating a portion of the quota for a particular group of requests and/or a server, it may ensure that other requests/servers are able to be guaranteed allocation of another portion of the quota. In some embodiments, the amount of quota allocation has been dynamically and/or statically determined based on one or more of the following: allocation utilization history of a server receiving the quota, a historical average amount of quota resource utilization, a user defined allocation amount value, an amount of remaining quota, a user associated with a server, a time of day, a day of week, a time period, a number of servers to be pre-allocated, and a priority value associated with a server receiving the quota. In some embodiments, the quota allocation is only valid for a limited amount of time and the allocation expires at the end of the limited time. In some embodiments, at the expiration of the quota, the remaining amount of the quota allocation that has not been utilized or the amount of the quota allocation that has been utilized is reported. For example, this report may be utilized to better predict future quota allocation for a particular server and redistribute any unutilized allocation to other servers and/or users. The quota may be renewed for an additional time period. In some embodiments, the quota allocation is periodically received. In some embodiments, the quota allocation is dynamically received. For example, the quota allocation is received in response to a request.

At 404, a request is received. In some embodiments, the request includes a request for data. In some embodiments, the request includes an online service request. In some embodiments, the request is received via an API. In some embodiments, the request is a request received in 202 of FIG. 2.

At 406, it is determined whether allowing the request will exceed a remaining value of the quota allocation. For example, it is determined whether the amount of the resource limited by the quota allocation required to process the request to completion exceeds an amount of the resource indicated by the remaining value of the quota allocation.

If at 406 it is determined that the allowing the request will not exceed the remaining value of the quota allocation, at 408 the request is allowed to be processed. For example, the request is allowed to utilize the limited resource tracked by the quota allocation to complete the request. The amount of the quota allocation utilized in processing the request may be tracked and utilized to reduce the remaining value of the quota allocation by the utilized amount.

If at 406 it is determined that the allowing the request will exceed the remaining value of the quota allocation, at 410 additional quota allocation is requested. For example, a request is sent to quota storage 128 of FIG. 1 to request additional quota allocation. The request may include an identifier of the quota allocation desired to be obtained, amount of quota allocation remaining, and/or a desired amount of the quota allocation. In an alternative embodiment, rather than requesting additional quota allocation, the request is identified/determined to be not allowed and the request is not allowed.

At 412, it is determined whether additional quota allocation has been received. If at 412 it is determined that the additional quota allocation has been received, at 416 the remaining value of the quota allocation is updated using the additional quota allocation (e.g., additional value of the new quota allocation added to remaining value of the quota allocation or the additional quota allocation replaces the old remaining value of the quota allocation) and the process returns to 406. If at 412 it is determined that the additional quota allocation has not been received, at 414 the request is handled as a not allowed request. For example, a specified behavior for the not allowed determination for the request is performed. For example, a requester of the request and/or an administrator/programmer of the system processing the request has specified for the request a specific behavior to be performed in the event the request is determined to be not allowed. Examples of the specified behavior include providing a message, providing an indication, retrying the request, dropping the request, indicating a request to obtain additional quota, prompting a user to purchase additional quota, and any other desired behavior associated with the request.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
   one or more computers and one or more storage devices storing instructions that are operable, when executed by the one or more computers, to cause the one or more computers to perform operations comprising:
- receiving, within a periodic time period by a server and from one or more clients, a plurality of requests that are each associated with a weight that reflects an amount of resources that processing the selected request requires;
- for the plurality of received requests, synchronously providing a request for an indication of a threshold associated with all of the plurality of received selected requests;
- receiving the indication of the threshold;
- determining that the threshold is insufficient to process all of the plurality of requests during a next time period;
- in response to determining that the threshold is insufficient to process all of the plurality of requests during the next time period, selecting a subset of the plurality of requests to be processed during the next periodic time period based on the amount of resources needed to process the subset of requests; and
- allowing processing of the subset of the requests during the next periodic time period, wherein allowing processing of the subset of the requests during the next periodic time period comprises alternating across periodic time periods between prioritizing requests that take more resources and requests that take less resources.

2. The system of claim 1, wherein the threshold identifies a utilization limit of a limited resource required to process each of the plurality of received requests.

3. The system of claim 1, wherein the operations further comprise providing a single update to update the threshold for all of the number of the received requests that has been selected in the subset of requests to be processed during the next periodic time period.

4. The system of claim 3, wherein the update identifies a total amount of a limited resource of the threshold that will be utilized in processing the received requests selected in the subset of requests to be processed during the next periodic time period.

5. The system of claim 1, wherein the request is a request for an online service accessed using an Application Programming Interface (API).

6. The system of claim 1, wherein the system is an API edge server of an API service platform.

7. The system of claim 1, wherein the threshold is specific to a requester of the selected requests.

8. The system of claim 1, wherein synchronously providing the request for the indication of the threshold includes providing the request only after an end of the time period.

9. The system of claim 1, wherein the received threshold is an allocation of a portion of a total threshold.

10. The system of claim 9, wherein the allocation is specific to the system and an amount of the allocation has been dynamically determined based on an allocation utilization history of the system.

11. The system of claim 1, wherein the operations further comprise performing for one of the received requests that has not been allowed, a specified behavior specified by a user to be performed in the event the received request is not allowed.

12. The system of claim 1, wherein selecting a subset of the plurality of requests to be processed during the next periodic time period based on the amount of resources needed to process the subset of requests includes allowing a number of the plurality of received requests in a manner that does exceed a limit value of the threshold.

13. The system of claim 1, wherein selecting a subset of the plurality of requests to be processed during the next periodic time period based on the amount of resources needed to process the subset of requests includes allowing a maximum number of the received requests in the order of the sort without exceeding a limit of the threshold.

14. The system of claim 1, wherein the received threshold is a pre-allocated threshold allocation that has been allocated prior to the beginning of the time period.

15. A computer-implemented method comprising:
- receiving, within a periodic time period by a server and from one or more clients, a plurality of requests that are each associated with a weight that reflects an amount of resources that processing the selected request requires;
- for the plurality of received requests, synchronously providing a request for an indication of a threshold associated with all of the plurality of received selected requests;
- receiving the indication of the threshold;
- determining that the threshold is insufficient to process all of the plurality of requests during a next time period;
- in response to determining that the threshold is insufficient to process all of the plurality of requests during the next time period, selecting a subset of the plurality of requests to be processed during the next periodic time period based on the amount of resources needed to process the subset of requests; and
- allowing processing of the subset of the requests during the next periodic time period, wherein allowing processing of the subset of the requests during the next periodic time period comprises alternating across periodic time periods between prioritizing requests that take more resources and requests that take less resources.

16. The method of claim 15, wherein the threshold identifies a utilization limit of a limited resource required to process each of the plurality of received requests.

17. The method of claim 15, further comprising providing a single update to update the threshold for all of the number of the received requests that has been selected in the subset of requests to be processed during the next periodic time period.

18. The method of claim 17, wherein the update identifies a total amount of a limited resource of the threshold that will be utilized in processing the received requests selected in the subset of requests to be processed during the next periodic time period.

19. The method of claim 15, wherein the request is a request for an online service accessed using an Application Programming Interface (API).

20. A non-transitory computer-readable medium storing software comprising instructions executable by one or more computers which, upon such execution, cause the one or more computers to perform operations comprising:
- receiving, within a periodic time period by a server and from one or more clients, a plurality of requests that are each associated with a weight that reflects an amount of resources that processing the selected request requires;
- for the plurality of received requests, synchronously providing a request for an indication of a threshold associated with all of the plurality of received selected requests;
- receiving the indication of the threshold;
- determining that the threshold is insufficient to process all of the plurality of requests during a next time period;

in response to determining that the threshold is insufficient to process all of the plurality of requests during the next time period, selecting a subset of the plurality of requests to be processed during the next periodic time period based on the amount of resources needed to process the subset of requests; and allowing processing of the subset of the requests during the next periodic time period, wherein allowing processing of the subset of the requests during the next periodic time period comprises alternating across periodic time periods between prioritizing requests that take more resources and requests that take less resources.

* * * * *